Patented Aug. 27, 1946

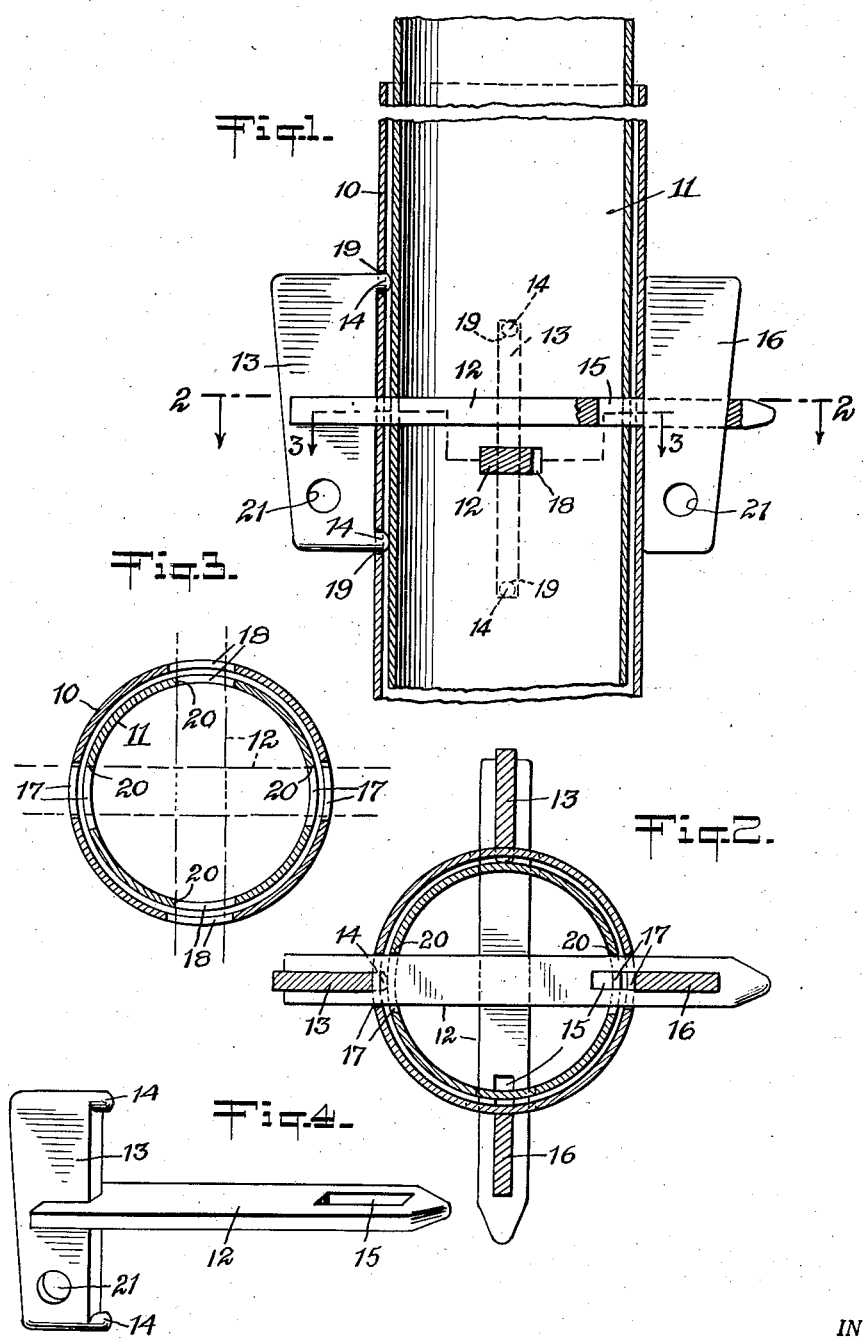

2,406,668

UNITED STATES PATENT OFFICE 2,406,668

TOWER OR MAST

Harold Cohen, Elizabeth, N. J.

Application September 8, 1944, Serial No. 553,136

4 Claims. (Cl. 287—103)

This invention relates to the construction of towers, masts and analogous structures.

The principal object of the present invention is the provision of improvements whereby structural elements may be rigidly secured to each other in extended relation regardless of any inequalities in the cross-sectional sizes of such elements as they are manufactured.

A further object is the provision of improvements of the indicated character which enables the fabrication of the class of structures mentioned, and also enables them to be dismantled quickly and easily.

A further object is the provision of means of the indicated character which not only rigidly secures the components of a structure to each other, but also affords a good electrical connection between the parts in construction of towers and masts.

The nature of the invention and its distinguishing features and advantages will appear when the following specification is read in conjunction with the accompanying drawing, in which—

Fig. 1 is a fragmentary vertical sectional view showing telescoped structural elements rigidly secured in accordance with the invention.

Fig. 2 is a sectional view taken on the line 2—2 of Fig. 1.

Fig. 3 is a sectional view taken on the line 3—3 of Fig. 1 omitting the securing devices, but showing the cross-bars thereof in dot and dash lines.

Fig. 4 is a perspective view of one of the main parts of a securing device.

In the drawing there are shown tubular structural elements 10 and 11 which may constitute leg sections, supports or components of a tower, mast or analogous structures. The elements 10 and 11 are arranged in extended relation so that portions thereof telescope with respect to each other, that is to say, the element 10 for a portion of its length surrounds the element 11 for a portion of its length.

In the manufacture of tubing to be used, as structural elements, such as the elements 10 and 11, they are not always of uniform cross-sectional size for a close interfit of the elements when telescoped. Unless provision is made for such inequalities the elements cannot be rigidly secured to each other in an extended telescoped relation and they will be loose and wobble.

In accordance with the present invention use is made of a securing device of such type that a pair of the same in use cooperate with each other to effect the rigid securement of the structural elements aforesaid.

The securing device referred to consists of two main parts. One of said parts consists of a crossbar 12 having a clamping member 13 fixed on one end thereof in any suitable manner. The member 13 is disposed at a right angle to the cross-bar 12, and has laterally extending projections 14 at or near the ends thereof. The cross-bar 12 has a longitudinal slot 15 therein near the other end thereof. The other main part 16 of the device is wedge shape and is adapted to be received in the slot 15 so as to be disposed at a right angle to the cross-bar 12 in opposition to the member 13.

Two similar securing devices are used at a right angle to each other. Consequently, each element 10 and 11 has diametrically disposed holes 17 therein which register with each other in pairs to receive one cross-bar 12, and each element 10 and 11 also has diametrically disposed holes 18 therein which register with each other in pairs to receive the second cross-bar 12. The element 10 also has spaced holes 19 to receive the projections 14 of the respective clamping members 13.

When the elements 10 and 11 are in the telescoped relation, the cross-bars 12 may be extended transversely through the elements 10 and 11 at a right angle with respect to each other by reason of the holes 17 and 18, and the projections 14 are disposed in the holes 19. By inserting the clamping members 16 into the respective slots 15 and forcing them downwardly, said members 16 will cooperate with the cross-bars 12 while bearing on the element 10. This will cause the projections 14 to bear on the element 11 in vertical planes at a right angle with respect to each other, and the element 11, in turn, will impinge on the cross-bars 12 at the points designated 20 in Fig. 3. In this manner the elements 10 and 11 are rigidly secured in the telescoped extended relation.

The size of the holes 17 and 18 may be somewhat larger than the cross-sectional size of the cross-bars 12. This may cause the element 11 to be off-center with respect to the element 10. In practice the variance from true axial alinement is negligible. The holes 17 and 18 may be of such size and arrangement to assure axial alinement of the elements 10 and 11 when secured. The difference in the interior diameter of the element 10 with respect to the exterior diameter of the element 11 is exaggerated in the drawing.

The various parts made of suitable metal and secured in the manner described afford good electrical connections desirable in towers and masts having electrical installations, such as radio aerials and antennae.

The members 13 and 16 each has a hole 21 to accommodate a guy line for sustaining a tower or mast upright when erected. Such line applied to the member 16 aids in retaining it in its functioning position.

I claim:

1. In a structure of the character described, structural elements arranged so that portions thereof are telescoped, said portions having registering holes therein, a cross-bar extending loosely in the holes in said portions transversely of said portions, and a device acting on said elements to rigidly secure said elements in the telescoped relation, and wherein the inner telescoped portion laterally impinges on said cross-bar.

2. In a structure of the character described, tubular structural elements arranged so that portions thereof are telescoped, said portions having registering holes therein, cross-bars extending loosely in the holes in said portions transversely of said portions and at a right angle with respect to each other, and means cooperating with said cross-bars and acting on said portions to rigidly secure said elements in the telescoped relation, and wherein the inner telescoped portion laterally impinges on said cross-bars.

3. In a structure as set forth in claim 1, wherein said device consists of two cooperative parts capable of exerting a clamping action.

4. In a structure as set forth in claim 1, wherein said device consists of two cooperative parts capable of exerting a clamping action, and one of said parts has projections extending through the outer telescoped portion and bearing on the inner telescoped portion.

HAROLD COHEN.